July 8, 1969     D. A. HALPIN     3,454,184
SELF-ALIGNING COVER FOR ACCESS OPENINGS
Filed Jan. 25, 1968
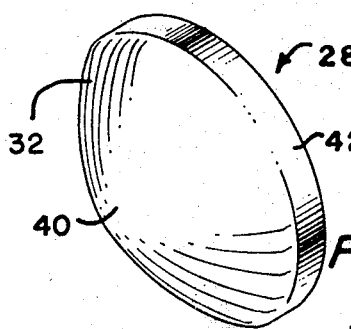
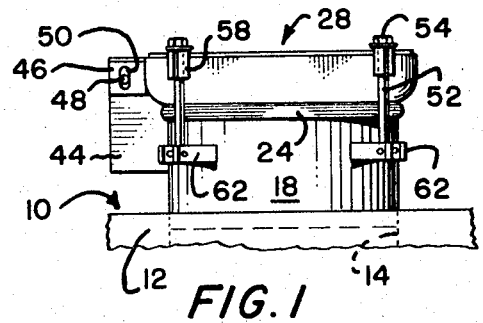
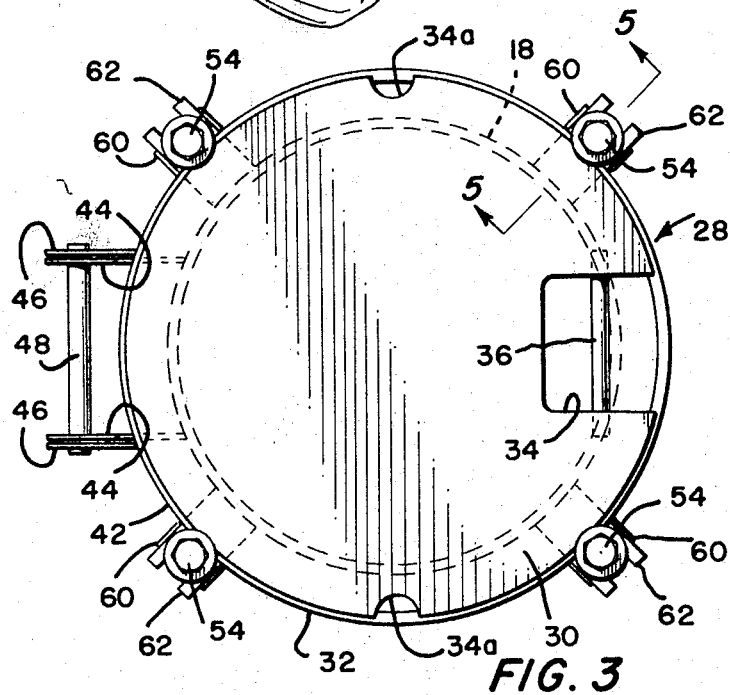
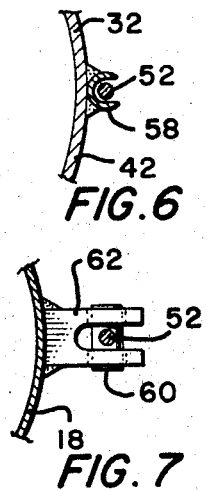
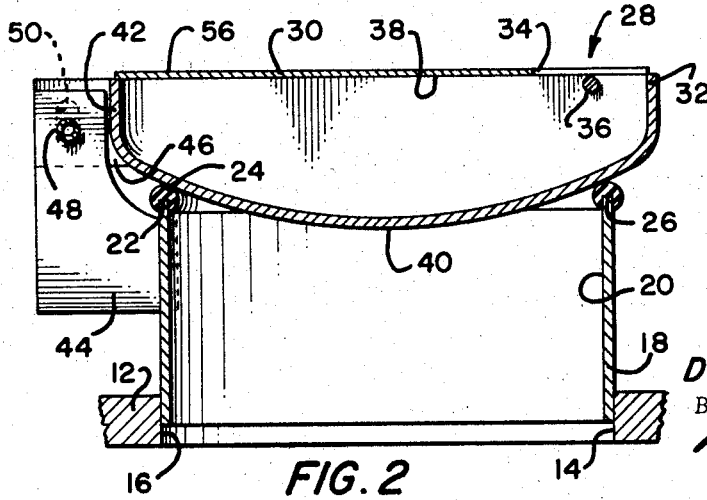
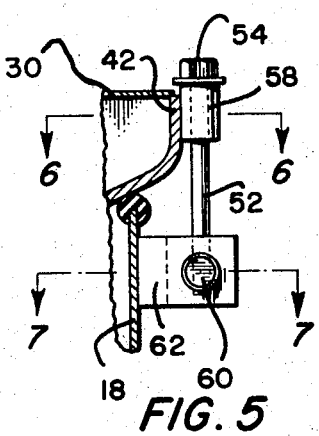
INVENTOR.
DONALD A. HALPIN
BY *Robert R. Paquin*
ATTORNEY United States Patent Office 3,454,184
Patented July 8, 1969

3,454,184
SELF-ALIGNING COVER FOR ACCESS OPENINGS
Donald A. Halpin, Easton, Pa., assignor to Ingersoll-Rand Company, New York, N.Y., a corporation of New Jersey
Filed Jan. 25, 1968, Ser. No. 700,451
Int. Cl. B65d 53/02
U.S. Cl. 220—46                    3 Claims

ABSTRACT OF THE DISCLOSURE

A self-aligning cover for a manhole or other access opening, comprising a generally dome shaped engagement surface which cooperates with a resilient sealing ring mounted on a wall defining the opening to automatically align the cover with the opening during movement of the cover to a closed position.

Background of the invention

The present invention relates to manholes and other openings adapted to provide access to the interior of an enclosure and more particularly to the provision of a new and improved, self-aligning cover for openings of these types.

Conventionally, covers for manholes and other access openings normally require either precise machining and/or centering devices for properly aligning the cover with the opening to prevent leakage into the enclosure. This requirement for precise machining of the cover during its manufacture is, of course, undesirable due to its attendant expense. Moreover, although the cover may be machined to be initially a precise fit in the opening, normal usage frequently damages the machined surfaces sufficiently to permit leakage. The use of centering devices is also undesirable in that the latter are prone to misalignment after normal use and, therefore, must be constantly realigned.

Summary of the invention

An object of the present invention is to provide a new and improved cover which is particularly constructed and arranged to be self-aligning without the necessity for either centering devices and/or precisely machined surfaces.

Another object of the invention is to provide a new and improved cover of the type set forth which is particularly constructed and arranged to prolong the effective life of a protective coating employed thereon.

Another object is to provide a new and improved cover of the type set forth which, although highly efficient and dependable in operation, is relatively simple and economical in construction.

In general, these objects are attained by the combination comprising a base peripherally defining an access opening, a resilient annular sealing element mounted on the base at one end thereof, a cover, and hinge means pivotally mounting the cover for movement between a closed position wherein the cover extends transversely to the base at such one end thereof for closing the there-adjacent end of the access opening and an open position wherein such end of the access opening is open. The hinge means comprises a hinge pin associated with one of the cover and base and also comprises mounting means associated with the other of the cover and base and including a hinge pin opening which receives the hinge pin and is substantially larger than the latter to cause limited lateral movement of the axis of the hinge pin relative to the hinge pin opening during movement of the cover. In addition, the cover is formed to include a generally dome shaped or hemispherical engagement surface arranged to engage the annular sealing element whereby the engagement surface and sealing element co-operate to align the cover with the access opening during movement of the cover.

Brief description of the drawings

Referring to the drawings:
FIG. 1 is an elevational side view illustrating an embodiment of the cover provided by the present invention in closed position;
FIG. 2 is an enlarged elevational sectional view of the embodiment of the cover shown in FIG. 1;
FIG. 3 is a top or plan view of such cover;
FIG. 4 is a pictorial view of such cover;
FIG. 5 is a sectional view taken substantially on line 5—5 of FIG. 3, looking in the direction of the arrows;
FIG. 6 is a sectional view taken on line 6—6 of FIG. 5, looking in the direction of the arrows; and
FIG. 7 is a sectional view taken on line 7—7 of FIG. 5, looking in the direction of the arrows.

Description of the preferred embodiment

Referring more particularly to the drawings wherein similar reference characters designate corresponding parts throughout the several views, FIG. 1 fragmentarily illustrates an enclosure designated generally as 10 which may be, for example, the shell of a conventional steam surface condenser. The enclosure 10 is provided with a manhole or access opening, arranged to provide access to the interior of the enclosure 10, the upper end of which is shown closed by a cover constructed in accordance with the present invention.

More particularly, as shown in FIG. 2, the wall 12 of the enclosure 10 is formed to include a generally cylindrical wall opening 14 communicating with the interior of the enclosure 10 and peripherally bounded by an annular flange 16. An annular base or manhole wall 18, peripherally defining a generally cylindrical manhole or access opening 20 generally coextensive with the length of the base 18, is welded or otherwise affixed at its lower end to the flange 16 such that the access opening 20 communicates with the interior of the enclosure 10. The other or upper end of the base 18 is formed to include a squared, annular rim or edge 22 which encircles the corresponding end of the access opening 20. A first engagement means consisting of an annular sealing ring or element 24 is fixedly mounted on the rim 22 by an annular slot 26 receiving the rim 22 and extends along the latter continuously throughout the length thereof. The sealing ring 24 is formed of rubber or other similar resilient material and is of a diameter substantially that of the base 18. Thus, as will be seen, the sealing ring 24 encircles the access opening 20 at the upper end of such opening 20.

The illustrated embodiment of the cover is designated generally as 28 and comprises a top plate 30 and a closure plate 32. The top plate 30 is constructed of generally circular or disc configuration, but is circumferentially cutout at 34 and 34a. A handle 36 is affixed to the undersurface 38 of the top plate 30 to be readily accessible through the cutout 34 and serves to facilitate the opening and closing of the cover 28. The cutouts 34a, as will be understood, facilitate removal or drainage of any collected dirt, condensation, water, or the like from the cover 28.

The closure plate 32, as illustrated in FIGS. 2 and 4, includes an imperforate, generally hemispherical or dome shaped, central engagement surface 40 and an annular flange 42 which projects from the circumference of the engagement surface 40 and is rigidly connected to the periphery of the top plate 30. The engagement surface 40, with the cover 28 in its illustrated closed position, extends generally laterally to the access opening 20 and directly engages the sealing ring 24 to close the upper end of such opening 20. The engagement surface 40 in this closed position, moreover, is coaxial with the access opening 20 and symmetrical about its axis. The sealing ring 24, as will be noted, is particularly constructed of a diameter and cross-section such that it engages the engagement surface 40 inwardly from the circumferential edge of the latter. Hence, the engagement surface 40 in the closed position of the cover 28 includes a central portion depending into the access opening 20 and a concentric annular portion external to such opening 20 and circumferential to the sealing ring 24. The engagement between the engagement surface 40 and the sealing ring 24, as will be understood, is the only contact of the engagement surface 40 relative to the base 18. That is, the engagement surface 40 only engages the sealing ring 24 and does not in any manner engage the base 18. Thus, as the sealing ring 24 is formed of rubber or other resilient material, the effective life of any epoxies, paints, plastics, or other protective coatings applied to the engagement surface 40 is prolonged.

The cover 28 is pivotally mounted by a hinge means for vertical movement between a closed position wherein, as illustrated, it closes the upper end of the access opening 20 and an open position wherein such upper end is open. More particularly, a pair of generally L-shaped hinge plates 44 are mounted in spaced relationship on the outer circumference of the base 18. A second pair of hinge plates 46 are rigidly connected to the flange 42 of the closure plate 32 and arranged whereby each is immediately adjacent one of the hinge plates 44. A hinge pin 48 is affixed to each of the hinge plates 44 and arranged such that its opposing ends are received in aligned hinge pin openings 50 formed in the hinge plates 46. The hinge pin openings 50 are each formed substantially larger than their received end of the hinge pin 48 in a vertical direction.

A retaining means is provided for securing or locking the cover 28 in its illustrated closed position. More specifically, a plurality of retaining bolts 52, having bolt heads 54 arranged immediately above the upper surface 56 of the top plate 30, are positioned at arcuately spaced locations around the cover 28. The retaining bolts 52 each extend through a guide 58 carried by the flange 42 of the closure plate 32 and in their locking positions are arranged such that the bolt heads 54 abut the guides 58. The lower ends of the retaining bolts 52 each are threadedly secured to a supporting pin 60 pivotally mounted on flange plates 62 carried by the base 18. The cover 28 is unlocked from its illustrated closed position by merely unthreading the retaining bolts 52 sufficiently that the bolt heads 54 are free of the guides 58 and then pivoting the retaining bolts 52 to free the cover 28. Conversely, the cover 28 is locked in its closed position by pivoting the retaining bolts 52 to reposition the bolt heads 54 above their respective guides 58 and then screwing the bolts 52 down to cause the bolt heads 54 to abut the guides 58.

From the preceding description it will be seen that the cover 28 is opened from its illustrated closed position by partially unthreading the retaining bolts 52 to free the bolt heads 54 from the guides 58, pivoting the retaining bolts 52 to positions wherein they present no interference to vertical movement of the cover 28, and then manually pivoting the cover 28 to a position in which the upper end of the access opening 20 is open. The sealing ring 24 with the cover 28 in this open position, as will be noted, prevents contacts between the rim 22 and any person or object passing through the access opening 20 and, hence, eliminates the possibility that such person or object will be injured or damaged by contact with the rim 22.

To again close the cover 28, the latter is manually pivoted towards its illustrated closed position whereupon the engagement surface 40 and the sealing ring 24 cooperate to align the cover 28 with the access opening 20 such that, when completely closed, the cover 28 is centered relative to the access opening 20. (The beforedescribed construction of the hinge means, as will be noted, permits this alignment of the cover 28 by the engagement surface 40 and sealing ring 24.) The cover 28 is then locked in closed position by pivoting the retaining bolts 52 to position the bolt heads 54 above the cover 28 and screwing the bolts 52 down sufficiently to cause the bolt heads 54 to engage the guides 58. The sealing ring 20, as will be noted, provides a sealing surface for the cover 28 and prevents leakage which might otherwise flow into the access opening 20 past the cover 28.

From the aforegoing description it will be seen that, during pivotal movement of the cover 28 to its illustrated closed position, the engagement surface 40 and sealing ring 24 cooperate to align the cover 28 with the access opening 20 such that, when in fully closed position, the cover 28 is centered relative to the access opening 20. It will also be seen that the resilient nature of the sealing ring 24 prevents the engagement of the engagement surface 40 and sealing ring 24 from damaging any protective coatings applied to the engagement surface 40; and, moreover, that the sealing ring 24 functions not only as a seal when the cover 28 is closed, but also as a protective covering or guard on the rim 22 when the cover 28 is open.

Thus, it will be apparent that I have provided new and improved means for accomplishing all of the objects and advantages of my invention.

Having thus described my invention, I claim:

1. In combination, a base peripherally defining an access opening, a resilient annular sealing element mounted on said base at one end thereof, a cover, hinge means pivotally mounting said cover for movement between a closed position wherein said cover extends transversely to said base at said one end thereof for closing the thereadjacent end of the access opening and an open position wherein such end of the access opening is open, said hinge means comprising a hinge pin associated with one of said cover and base, said hinge means also comprising mounting means associated with the other of said cover and base and including a hinge pin opening receiving said hinge pin, such hinge pin opening being substantially larger than said hinge pin to cause limited lateral movement of the axis of said hinge pin relative to said hinge pin opening during movement of said cover, said cover including a generally hemispherical engagement surface extending generally laterally to said base with said cover in said closed position and arranged to engage said annular sealing element inwardly of its peripheral edge whereby said engagement surface and said sealing element cooperate to align said cover with said access opening during movement of said cover.

2. The combination of claim 1, wherein the engagement of said annular sealing element with said engagement surface is the sole contact of said engagement surface relative to said base, said one end of said base includes an annular rim, said annular sealing element is mounted on said rim to extend circumferentially therealong, and retaining means are provided for securing said cover in said closed position.

3. The combination of claim 2, wherein said hinge pin is carried by said base, said mounting means comprises a pair of spaced flanges carried by said cover and including aligned hinge pin openings larger than said hinge pin to permit said limited lateral movement, and said retaining means comprises a plurality of retaining elements arranged at spaced locations along the periphery of said cover.

References Cited

UNITED STATES PATENTS

| | | | |
|---|---|---|---|
| 2,523,639 | 9/1950 | Tucker | 220—46 |
| 3,092,285 | 5/1963 | Cox. | |
| 3,293,829 | 12/1966 | Mafrica | 220—46 |

JAMES B. MARBERT, *Primary Examiner.*